United States Patent [19]
Stolfo et al.

[11] Patent Number: 5,497,486
[45] Date of Patent: Mar. 5, 1996

[54] METHOD OF MERGING LARGE DATABASES IN PARALLEL

[75] Inventors: Salvatore J. Stolfo, 80 Kenilworth Rd., Ridgewood, N.J. 07450; Mauricio A. Hernández, New York, N.Y.

[73] Assignee: Salvatore J. Stolfo, Ridgewood, N.J.

[21] Appl. No.: 213,795

[22] Filed: Mar. 15, 1994

[51] Int. Cl.⁶ .................... G06F 7/06; G06F 7/14; G06F 7/20
[52] U.S. Cl. .................... 395/600; 395/800; 395/180; 364/974.7; 364/DIG. 2; 364/DIG. 1; 364/283.4
[58] Field of Search .................... 395/600, 800; 364/408

[56] References Cited

U.S. PATENT DOCUMENTS

| | | | |
|---|---|---|---|
| 4,209,845 | 6/1980 | Berger et al. | 395/800 |
| 4,930,072 | 5/1990 | Agrawal et al. | 395/600 |
| 5,111,395 | 5/1992 | Smith et al. | 364/408 |
| 5,142,687 | 8/1992 | Lary | 395/800 |
| 5,146,590 | 9/1992 | Lorie et al. | 395/600 |
| 5,193,207 | 3/1993 | Vander Vegt et al. | 395/800 |
| 5,303,149 | 4/1994 | Janigian | 364/408 |
| 5,319,739 | 6/1994 | Yoshiura et al. | 395/51 |
| 5,355,481 | 10/1994 | Sluijter | 395/600 |

Primary Examiner—Thomas G. Black
Assistant Examiner—Cuan Pham
Attorney, Agent, or Firm—Mitchell A. Stein; Felfe & Lynch

[57] ABSTRACT

The semantic integration problem for merging multiple databases of very large size, the merge/purge problem, can be solved by multiple runs of the sorted neighborhood method or the clustering method with small windows followed by the computation of the transitive closure over the results of each run. The sorted neighborhood method works well under this scheme but is computationally expensive due to the sorting phase. An alternative method based on data clustering that reduces the complexity to linear time making multiple runs followed by transitive closure feasible and efficient. A method is provided for identifying duplicate records in a database, each record having at least one field and a plurality of keys, including the steps of sorting the records according to a criteria applied to a first key; comparing a number of consecutive sorted records to each other, wherein the number is less than a number of records in said database and identifying a first group of duplicate records; storing the identity of the first group; sorting the records according to a criteria applied to a second key; comparing a number of consecutive sorted records to each other, wherein the number is less than a number of records in said database and identifying a second group of duplicate records; storing the identity of the second group; and subjecting the union of the first and second groups to transitive closure.

3 Claims, 12 Drawing Sheets

METHOD OF MERGING LARGE DATABASES IN PARALLEL

FIELD OF THE INVENTION

The present invention related to the field of very large database verification merging and coalescing systems, and more particularly to the field of mailing list redundancy checking.

BACKGROUND OF THE INVENTION

Merging and coalescing multiple sources of information into one unified database requires more than structurally integrating diverse database schema and access methods. In applications where the data is corrupted, i.e. is incorrect, ambiguous, having alternate forms or has changed over time, the problem of integrating multiple databases is particularly challenging. This is known as the merge/purge problem. Merging information requires so-called semantic integration, which requires a means for identifying equivalent or similar data from diverse sources. The merging process must then determine whether two pieces of information or records are of sufficient similarity, and that they represent some aspect of the same domain entity, by means of sophisticated inference techniques and knowledge of the domain.

A very large database is one in which it is unfeasible to compare each record with every other record in the database, for a given operation. Therefore, a simplifying presumption is necessary in order to ensure the integrity of the data records, such as when a batch of new records is added to the database. In general, this presumption is that a predetermined subset of the database records may be selected in which a cross comparison of the records within the subset will be effective to ensure the integrity of the entire database, to within a reasonable limit.

In the field of mailing list verification, the database integrity is generally ensured by first sorting the database according to a criteria, then selecting a window of consecutive sorted records, and then comparing the records within the window with each other. The purpose is to eliminate duplicate records, so that within the window, records which appear to correspond are identified as such, and an algorithm is executed to select a single record as being accurate and to eliminate any other corresponding records. This known method, however, will not eliminate records which are corresponding and yet are not present within the window. Further, the comparison algorithm may not perfectly identify and eliminate duplicate records.

Known very large database systems may be maintained and processed on mainframe-class computers, which are maintained by service bureaus or data processing departments. Because of the size of these databases, among other reasons, processing is generally not networked, e.g. the data storage subsystem is linked directly to the central processor on which it is processed and directly output.

Other database processing methods are known, however these have not been applied to very large databases. This is not a matter of merely database size, but rather magnitude. In general, the reason for ensuring the integrity of a mailing list database is a matter of economics, e.g. the cost of allowing errors in the database as compared to the cost of correcting or preventing errors. Of course, when these databases are employed for other applications, the "cost" of errors may be both economic and non-economic. Often, databases are maintained for many purposes, including mailing list, and thus the costs may be indeterminate or incalculable.

The semantic integration problem, see ACM SIGMOD record (December 1991), and the related so-called instance-identification problem, see Y. R. Wang and S. E. Madnick, "The inter-database instance identification problem in integrating autonomous systems", *Proceedings of the Sixth International Conference on Data Engineering* (February 1989), as applied to very large databases are ubiquitous in modern commercial and military organizations. As stated above, these problems are typically solved by using mainframe computing solutions. Further, since these organizations have previously implemented mainframe class solutions, they typically have already made a substantial investment in hardware and software, and therefore will generally define the problem such that it will optimally be addressed with the existing database infrastructure.

Routinely, large quantities of information, which may in some instances exceed one billion database records, are acquired and merged or added into a single database structure, often an existing database. Sonhe of the new data or information to be merged from diverse sources or various organizations might, upon analysis, be found to contain irrelevant or erroneous information or be redundant with preexisting data. This irrelevant, erroneous or redundant information is purged from the combined database.

Once the data is merged, other inferences may be applied to the newly acquired information; e.g. new information may be gleaned from the data set. The ability to fully analyze the data is expected to be of growing importance with the coming age of very large network computing architectures.

The merge/purge problem is closely related to a multi-way join over a plurality of large database relations. The simplest known method of implementing database joins is by computing the Cartesian product, a quadratic time process, and selecting the relevant tuples. It is also known to optimize this process of completing the join processing by sort/merge and hash partitioning. These strategies, however, assume a total ordering over the domain of the join attributes or a "near perfect" hash function that provides the means of inspecting small partitions (windows) of tuples when computing the join. However, in practice, where data corruption is the norm, it is unlikely that there will be a total ordering of the data set, nor a perfect hash distribution. Known implemented methods nevertheless rely on these presumptions. Therefore, to the extent these presumptions are violated, the join process will be defective.

The fundamental problem is that the data supplied by the various sources typically includes identifiers or string data that are either erroneous or accurate but different in their expression from another existing record. The "equality" of two records over the domain of the common join attribute is not specified as a "simple" arithmetic predicate, but rather by a set of equational axioms that define equivalence, thus applying an equational theory. See S. Tsur, "PODS invited talk: Deductive databases in action", *Proc. of the* 1991 *ACM-PODS: Symposium on the Principles of Database Systems* (1991); M. C. Harrison and N. Rubin, "Another generalization of resolution", *Journal of the ACM,* 25(3) (July 1978). The process of determining whether two database records provide information about the same entity can be highly complex, especially if the equational theory is intractable. Therefore, significant pressures exist to minimize the complexity of the equational theory applied to the dataset, while effectively ensuring the integrity of the database in the presence of syntactical or structural irregularities.

The use of declarative rule programs implementing the equational theory to identify matching records is best implemented efficiently over a small partition of the data set. In the event of the application of declarative rule programs to large databases, the database must first be partitioned into meaningful parts or clusters, such that "matching" records are assigned to the same cluster.

Ordinarily the data is sorted to bring the corresponding or matching records close together. The data may also be partitioned into meaningful clusters, and individual matching records on each individual cluster are brought close together by sorting. This basic approach alone cannot, however, guarantee the "mergeable" records will fall in a close neighborhood in the sorted list.

SUMMARY AND OBJECTS OF THE INVENTION

The present invention relates to the use of a rule-based system for merging databases which declaratively uses an equational theory for ensuring database integrity. Further, according to the present invention, very large databases are accommodated, databases which are so large that parallel and distributed computing systems are preferred for achieving an acceptable performance in a reasonable amount of time with acceptable cost. The present invention preferably employs the so-called sorted neighborhood method to solve the merge/purge problem. Alternatively, a so-called clustering method may also be employed.

It is therefore an object of the present invention to provide a method for identifying duplicate records in a database, each record having at least one field and a plurality of keys, comprising the steps of sorting the records according to a criteria applied to a first key; comparing a number of consecutive sorted records to each other, wherein the number is less than a number of records in said database and identifying a first group of duplicate records; storing the identity of the first group; sorting the records according to a criteria applied to a second key; comparing a number of consecutive sorted records to each other, wherein the number is less than a number of records in said database and identifying a second group of duplicate records; storing the identity of the second group; and subjecting the union of the first and second groups to transitive closure.

It is a further object according to the present invention to provide a method of merging two tables of records, each record having a plurality of fields, comprising the steps of computing a first key for each record in each table by extracting at least a portion of a first field; sorting the records in each data list using the first key; comparing a predetermined number of sequential records sorted according to the first key to each other to determine if they match; storing identifiers for any matching records; computing a second key for each record in the table by extracting at least a portion of a second field; sorting the records in each data list using the second key; comparing a predetermined number of sequential records sorted according to the second key to each other to determine if they match; storing identifiers for any matching records; and subjecting the union of said stored identifiers to transitive closure.

According to the present invention, a further aspect includes a method in which at least one of said comparing steps comprises applying a rule-based equational theory to the records.

It is also an object of the present invention to provide a method including a step of eliminating all but one of any duplicate records from said database based on said transitive closure.

It is a still further object according to the present invention to provide a method in which the step of initially partitioning the records into clusters involves using a key extracted from the records.

A still further object of the invention provides for computing a first key step comprises scanning clusters of records in sequence, and for each scanned record extracting an n-attribute key, which is mapped into an n-dimensional cluster space.

Another object according to the present invention provides a method wherein the comparing step comprises comparing the records according to a characteristic selected from the group consisting of edit distance, phonetic distance and typewriter distance.

Another object according to the present invention provides for selecting a key from the group consisting of last name, first name, address, social security number and telephone number.

Still another object according to the present invention provides a method further comprising the step of preprocessing the records in the database using a thesaurus database to indicate relatedness. The thesaurus database may include linked records indicating related names and nicknames in a plurality of languages. The preprocessing step may also include the step of employing a spell checker to correct misspellings in the records. The spell checker preferably includes the correct spellings of known cities, and is employed to correct the spelling in a city field of a record.

Another object according to the present invention provides a parallel processing method in which the comparing a predetermined number of sequential records sorted according to the first key to each other to determine if they match step is performed on a separate processor than the comparing a predetermined number of sequential records sorted according to the second key to each other to determine if they match step. The database is preferably sorted in parallel using parallel merge sorting.

A further object according to the present invention provides a method, wherein N is the number of records in the database, P is the number of processors, each processor p, $1 \leq p \leq P$, being able to store M+w records, where w is the size of the merge phase window, and M is a blocking factor, P is less than N, MP is less than N, and $r_i$ represents record i in a block, $0 \leq i \leq MP-1$, comprising the steps of dividing the sorted database into N/MP blocks; processing each of the N/MP blocks in turn by providing each processor p with records $r_{(p-1)M}, \ldots, r_{pM-1}, \ldots, r_{pM+w-2}$, for $1 \leq p \leq P$, searching matching records independently at each processor using a window of size w; and repeating the processing step for the next block of records.

A still further object according to the present invention provides a method wherein N is the number of records in the database, P is the number of processors p, and C is the number of clusters to be formed per processor p, comprising the steps of dividing the range into CP subranges; assigning each processor C of the subranges; providing a coordinator processor which reads the database and sends each record to the appropriate processor; saving the received records at each processor in the proper local cluster and after the coordinator finishes reading and clustering the data among the processors, sorting and applying the window scanning method to the local clusters of each processor. The coordinator processor load balances the various processors using a simple longest processing time first strategy.

A further object according to the present invention is to provide an apparatus for identifying duplicate records in a database, each record having at least one field and a plurality of keys, comprising a storage medium or storing said records of the database; a connection system for selectively transmitting information from the database; and a processor having a memory, said processor receiving information from said connection system, for sorting the records according to a criteria applied to a first key; comparing a number of consecutive sorted records to each other, wherein said number is less than a number of records in said database and identifying a first group of duplicate records; storing the identity of said first group in said memory; sorting the records according to a criteria applied to a second key; comparing a number of consecutive sorted records to each other, wherein said number is less than a number of records in said database and identifying a second group of duplicate records; storing the identity of said second group in said memory; and subjecting the union of said first and second groups to transitive closure.

Further objects will become apparent from a review of the figures and detailed description of the invention, set forth below.

BRIEF DESCRIPTION OF THE DRAWINGS

The preferred embodiments will be explained by way of the drawings in which.

DETAILED DESCRIPTION OF THE PREFERRED EMBODIMENTS

THE MERGE/PURGE PROBLEM

Figure 1A:
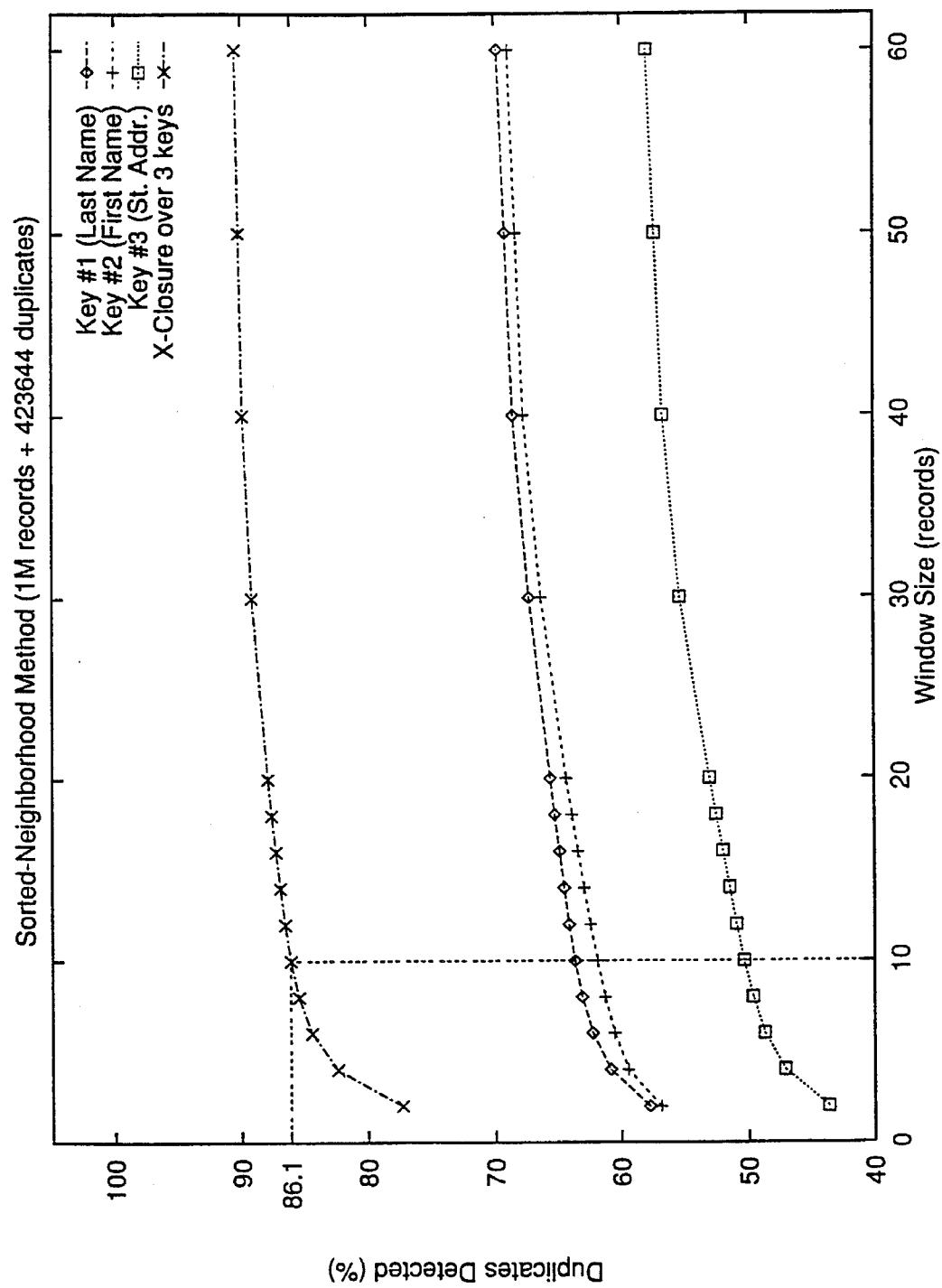
FIGS. 1A and 1B are two graphs of the percent correctly duplicated pairs for a 1,000,000 records database.

The present task relates to the merging of two or more databases, or tables within databases, with potentially many hundreds of millions of records. For the sake of discussion, let us assume that each record of the database represents information about employees and thus contains, e.g. social security numbers, a single name field, and an address field as well as other significant information. Numerous errors in the contents of the records are possible, and frequently encountered. For example, names may be routinely misspelled, parts missing, salutations at times included, as well as nicknames in the same field. In addition, employees that are the subject of the listing may move, or marry thus increasing the variability of their associated records. Table 1 displays records with such errors that may commonly be found in mailing lists for junk mail, for example.

There are two fundamental problems with performing a merge/purge procedure. First, the size of the data sets involved is so large that only a small portion of the database can reside in the processor main memory (RAM) at any point in time. Thus, the database resides on external store (e.g., magnetic media) and any algorithm employed must be efficient, requiring as few passes over the full data set as possible. Quadratic time algorithms are not feasible in this environment. Second, the incoming new data has a statistical likelihood of corruption, from either purposeful or accidental events, and thus the identification of matching data requires complex tests. Simple structural matching operations (i.e., one field "equals" another) are not possible in all cases. Furthermore, the inference that two data items represent the same domain entity may depend upon considerable knowledge of the task domain. This knowledge depends on the particular application and is available to those skilled in the art working with the database.

TABLE 1

| SSN | Name (First, Initial, Last) | Address |
|---|---|---|
| 334600443 | Lisa Boardman | 144 Wars St. |
| 334600443 | Lisa Brown | 144 Ward St. |
| 525520001 | Ramon Bonilla | 38 Ward St. |
| 525520001 | Raymond Bonilla | 38 Ward St. |
| 0 | Diana D. Ambrosion | 40 Brik Church Av. |
| 0 | Diana A. Dambrosion | 40 Brick Church Av. |
| 0 | Colette Johnen | 600 113th St. apt. 5a5 |
| 0 | John Colette | 600 113th St. ap. 585 |
| 850982319 | Ivette A Keegan | 23 Florida Av. |
| 950982319 | Yvette A Kegan | 23 Florida St. |

EXAMPLE 1

EXAMPLE OF MATCHING RECORDS DETECTED BY AN EQUATIONAL THEORY RULE BASE

THE SORTED NEIGHBORHOOD METHOD

Two approaches are available to obtain efficient execution of any solution: utilize parallel processing, and partition the data to reduce the combinatorics of matching large data sets. Hence, a means of effectively partitioning the data set in such a way as to restrict attention to as small a set of candidates for matching as possible is required. Consequently, the candidate sets may be processed in parallel. Furthermore, if the candidate sets can be restricted to a small subset of the data, quadratic time algorithms applied to each candidate set may indeed be feasible, leading to perhaps better functional performance of the merge task.

One possible method for bringing matching records close together is sorting the records. After the sort, the comparison of records is then restricted to a small neighborhood within the sorted list. This technique is referred herein as the sorted neighborhood method. The effectiveness of this approach is based on the quality of the chosen keys used in the sort. Poorly chosen keys will result in a poor quality merge, i.e., data that should be merged will be spread out far apart after the sort and hence will not be discovered. Keys should be chosen so that the attributes with the most discriminatory power should be the principal field inspected during the sort. This means that similar and matching records should have nearly equal key values. However, since it is assumed that the data contains corruptions, and keys are extracted directly from the data, then the keys could also be corrupted. Thus, it is expected that a substantial number of matching records will not be caught. In fact, experimental results, demonstrate this to be the case.

Given a group of two or more database tables, they can first be concatenated into one sequential list of records and then processed according to the sorted neighborhood method. The sorted neighborhood method for solving the merge/purge problem can be summarized in three phases:

Create Keys: Compute a key for each record in the list by extracting relevant fields or portions of fields.

Sort Data: Sort the records in the data list using the key of step 1.

Merge: Move a fixed size window through the sequential list of records limiting the comparisons for matching records to those records in the window. If the size of the window is w records, then every new record entering the window is compared with the previous records to find "matching" records. The first record in the window slides out of the window.

When this procedure is executed serially, the create keys phase is an O (N) operation, the sorting phase is O(N log N), and the merging phase is O(wN), where w is the number of records in the database. Thus, the total time complexity of this method is O (N log N) if w<[log N], O (wN) otherwise. However, the constants in the equations differ greatly. It could be relatively expensive (i.e. require substantial computational resources to solve a problem having a high computational complexity) to extract relevant key values from a record during the create key phase. Sorting requires a few machine instructions to compare the keys. The merge phase requires the matching of a large number of rules to compare two records, and thus has the largest constant factor. Note, however, the dominant cost will be the number of passes over the data set during sorting (possibly as many as log N passes), an I/O bounded computation.

CLUSTERING THE DATA FIRST

Since sorting the data is the dominant cost of the sorted-neighborhood method, it is desirable to reduce the number of records that are sorted. An easy solution is to first partition the data into clusters using a key extracted from the data. The sorted-neighborhood method is then applied to each individual cluster. This approach is called the clustering method.

Given a group of two or more databases, these can first be concatenated into one sequential list of records. The clustering method can be summarized as a two phase process:

Cluster Data: Scan the records in sequence and for each record extract an n-attribute key and map it into an n-dimensional cluster space. For instance, the first three letters of the last name could be mapped into a 3D cluster space.

Sorted-Neighborhood Method: The sorted-neighborhood method is applied independently on each cluster. It is not necessary, however, to recompute a key (step 1 of the sorted neighborhood method). The key extracted above for sorting may be employed. When this procedure is executed serially, the cluster data phase is an O (N) operation, and assuming the data is partitioned into C equal sized clusters, the sorted-neighborhood phase is O (N log (N/C)).

Clustering data as described above raises the issue of how well partitioned the data is after clustering. If the data from which the n-attribute key is extracted is distributed uniformly over its domain, then it can be expected that all clusters will have approximately the same number of records in them. But real-world data is very unlikely to be uniformly distributed and thus, it must be expected that it will be necessary to compute very large clusters and some empty clusters.

Sometimes the distribution of some fields in the data is known, or can be computed as the data is inserted into the database. For instance, a database may contain a field for names. Lists of person names are available from which, e.g., the distribution of the first three letters of every name can be computed, thus providing a cluster space of bins (26 letters plus the space). If such a list is unavailable, the name field of the database tables may be randomly sampled to have an approximation of the distribution of the first three letters. In any case, it is easy to create a frequency distribution histogram for several fields in the databases. All of this information can be gathered off-line before applying the clustering method.

Assuming the data is divided into C clusters using a key extracted from a particular field. Given a frequency distribution histogram with B bins for that field ($C \leq B$), those B bins (each bin represents a particular range of the field domain) may be divided into C subranges. Let $b_i$ be the normalized frequency for the $i^{th}$ bin of the histogram:

$$\sum_{i=1}^{B} b_i = 1$$

Then for each of the C subranges the expected sum of the frequencies over the subrange is close to 1/C (e.g., if bins s to e, $1 \leq s \leq e \leq B$ are assigned to one cluster then it is expected:

$$\sum_{i=s}^{e} b_i \simeq \frac{1}{C}$$

Each subrange will become one of the clusters and, given a record, the key is extracted from the selected field, and map the key into the corresponding subrange of the histogram. The complexity of this mapping is, at worst, log B.

EQUATIONAL THEORY

The comparison of records, during the merge phase, to determine their equivalence is a complex inferential process that considers much more information in the compared records than the keys used for sorting. For example, suppose two person names are spelled nearly (but not) identically, and have the exact same address. It might be inferred they are the same person. On the other hand, supposing two records have exactly the same social security numbers, but the names and addresses are completely different, it could either be assumed that the records represent the same person who changed his name and moved, or the records represent different persons, and the social security number field is incorrect for one of them. Without any further information, the latter might perhaps be assumed more likely. The more information there is in the records, the better inferences can be made. For example, Michael Smith and Michele Smith could have the same address, and their names are "reasonably close ". If gender information is available, it could be inferred that Michael and Michele are married or siblings.

What is needed to specify for these inferences is an equational theory that dictates the logic of domain equivalence, not simply value or string equivalence. There are of course numerous methods of specifying the axioms of the theory, including assembler code (presumably for speed). Users of a general purpose merge/purge facility will likely benefit from higher level formalisms and languages permitting ease of experimentation and modification. For these reasons, it is preferred to employ a natural approach to specifying an equational theory and making it practical, using a declarative rule language. Rule languages have been effectively used in a wide range of applications requiring inference over large data sets. Much research has been conducted to provide efficient means for their evaluation, and this technology can be exploited here for purposes of solving merge/purge. This technology is known to those skilled in the art.

As an example, a simplified rule in English that exemplifies one axiom of the equational theory relevant to merge/purge applied to the idealized employee database is shown below:

Given two records, r1 and r2.

IF the last name of r1 equals the last name of r2, AND the first names differ slightly, AND the address of r1 equals the address of r2 THEN r1 is equivalent to r2.

The implementation of "differ slightly" specified here in English is based upon the computation of a distance function applied to the first name fields of two records, and the comparison of its results to a threshold. The selection of a distance function and a proper threshold is also a knowledge intensive activity that demands experimental evaluation. An improperly chosen threshold will lead to either an increase in the number of falsely matched records or to a decrease in the number of matching records that should be merged. A number of alternative distance functions were implemented and tested including distances based upon edit distance, phonetic distance and "typewriter" distance. The results presented below are based upon edit distance computation since the outcome of the program did not vary much among the different distance functions.

For the purpose of experimental study, an OPS5 rule program consisting of 26 rules for this particular domain of employee records was used over relatively small databases of records. See C. L. Forgy, "OPS5 user's manual", *Technical Report CMU-CS*-81-135, Carnegie Mellon University (July 1981). Once the performance of the rules is deemed satisfactory, distance functions, and thresholds, the program was recoded with rules written directly in C to obtain speed-up over the OPS5 implementation. Table 1 demonstrates a number of actual records this program correctly deems equivalent. Although compilers for rule languages exist, see D. P. Miranker, B. Lofaso, G. Farmer, A. Chandra, and D. Brant. "On a TREAT -based production system compiler", *Proc. 10th Int'l Conf. on Expert Systems*, pp 617–630, (1990), there is still a significant gap in performance forcing the inevitable conversion to C. However, OPS5 provided an especially useful prototyping facility to define an equational theory conveniently.

USING THE TRANSITIVE CLOSURE OVER THE RESULTS OF INDEPENDENT RUNS

Once an equational theory is specified for matching database records and converted to a program, the matching program is applied to a small subset of data, e.g., those records presently in the window of the sorted list. The program output thus depends upon whether matching records appear in a window. Consequently, the effectiveness of the sorted neighborhood method highly depends on the key selected to sort the records. A key is defined to be a sequence of a subset of attributes, or substrings within the attributes, chosen from the record. (For example, the last name of the employee record may be chosen as a key, followed by the first non blank character of the first name field followed by the first six digits of the social security field, and so forth.)

In general, no single key will be sufficient to catch all matching records. Keys give implicit priorities to those fields of the records occurring at the beginning of the sequence of attributes over others. If the error in a record occurs in the particular field or portion of the field that is the most important part of the key, there is little chance this record will end up close to a matching record after sorting. For instance, if an employee has two records in the database, one with social security number 193456782 and another with social security number 913456782 (the first two numbers were transposed), and if the social security number is used as the principal field of the key, then it is very unlikely both records will fall under the same window. Thus, the records will not be merged. The number of matching records missed by one run of the sorted neighborhood method can be comparatively large.

To increase the number of similar records merged, two options can be explored. The first is simply widening the scanning window size by increasing w. Clearly this increases the complexity, and, as discussed in the next section, does not increase dramatically the number of similar records merged (unless of course the window spans the entire database, which as noted corresponds to an infeasible $N^2$ operation). The alternative strategy is implemented to execute several independent runs of the sorted neighborhood method, each time using a different key and a relatively small window. For instance, in one run, the social security number might be used as the principal part of the key while in another run the last name of the employee might be used as the principal part of the key. Each independent run will produce a set of pairs of records which can be merged. The transitive closure is then applied to those pairs of records. The results will be a union of all pairs discovered by all independent runs, with no duplicates, plus all those pairs that can be inferred by transitivity.

Figure 7:
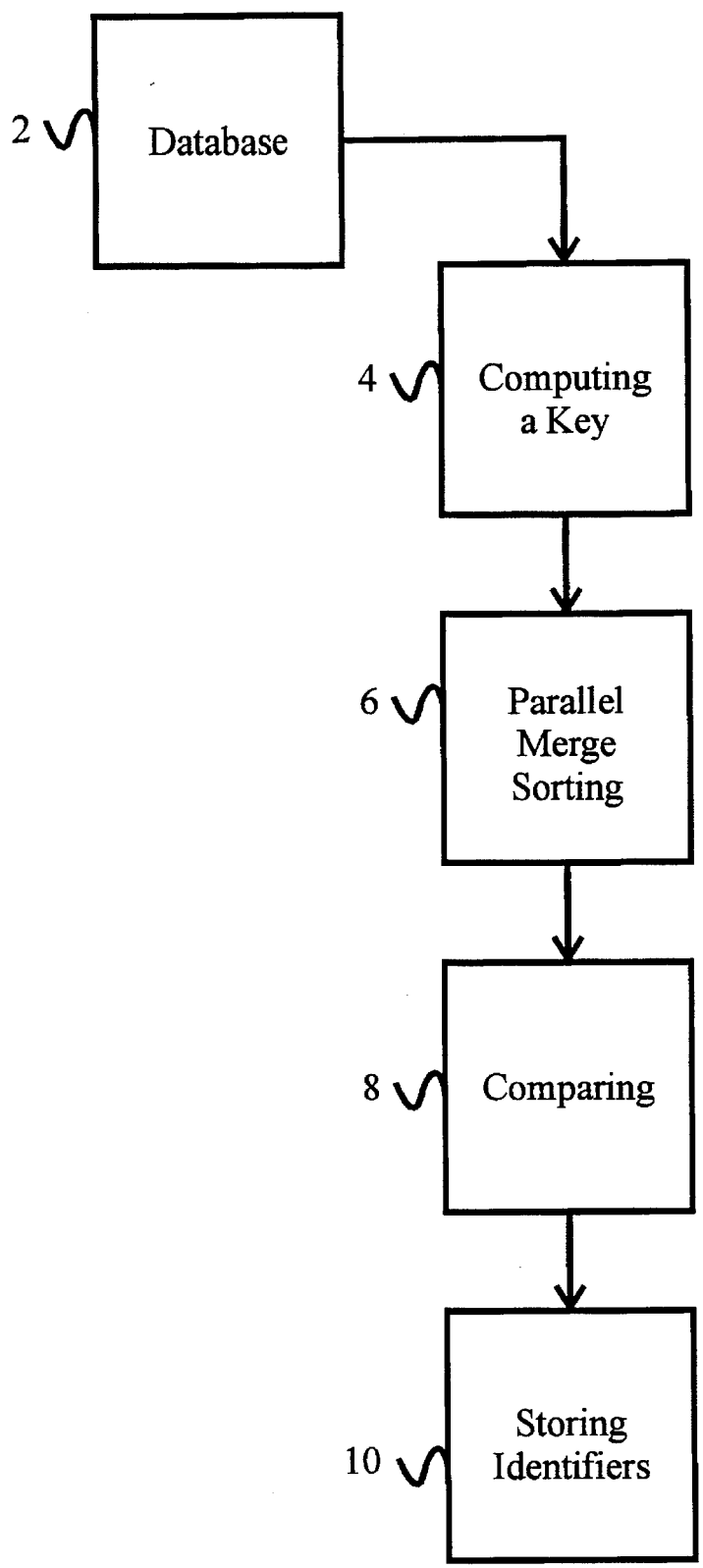
FIG. 7 is a flow chart representation of the steps involved in sorting, comparing and storing identifiers, in accordance with a preferred embodiment of the invention.
Figure 8:
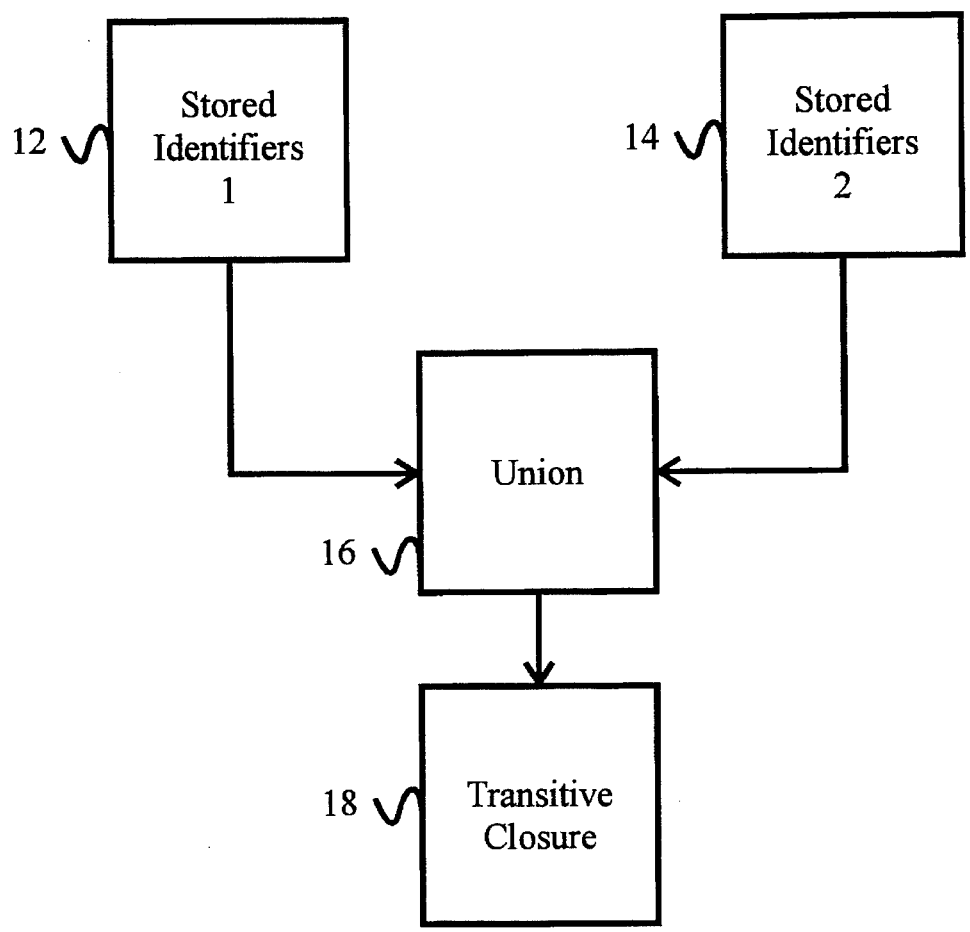
FIG. 8 is a flow chart representation of the steps involved in creating a union of stored identifiers, and subjecting the union to transitive closure.

More particularly, as shown in FIG. 7, database 2 is subjected to step 4 wherein a key is computed for each record in database 2 by extracting at least a portion of a first field. Next, the records in database 2 are subjected to the technique of parallel merge sorting at step 6. A predetermined number of sequential records sorted according to the key are compared to each other in step 8 to determine if one or more of the records match. Identifiers are created for any matching records and are stored in step 10.

Where the process shown in FIG. 7 is repeated for multiple databases or clusters of records in one database, stored identifiers 1 and 2 are created as shown in boxes 12 and 14 of FIG. 8. A union of these stored identifiers are created by step 16, and subjected to transitive closure as shown in step 18, of FIG. 8.

In the following, several independent runs of the sorted neighborhood method are combined with the transitive closure of the results, which drastically improves the results of one run of the sorted neighborhood method. A drawback of this combination is the need of several runs of the sorted neighborhood method. However, each independent run requires only a small search window. No individual run produced comparable results with large windows. Thus, the complexity of the merge phase for the sum total of these independent runs is smaller than the complexity of one run with a large window while its functional performance was far superior.

EXPERIMENTAL RESULTS

GENERATING THE DATABASES

All databases used to test the sorted neighborhood method and the clustering method were generated automatically by a database generator program. This database generator allows the selection among a large number of parameters including, the size of the database, the percentage of duplicate records in the database, and the amount of error to be introduced in the duplicated records. The principal benefit of the generator is to perform controlled studies and to establish the functional performance of the solution method. Each record generated consists of the following fields, some of which can be empty: social security number, first name, initial, last name, address, apartment, city, state, and zip code. The names are chosen randomly from a list of 63000 real names. The cities, states, and zip codes (all from the U.S.A.) come from publicly available lists.

The noise introduced in the duplicate records can go from small typographical changes, to complete change of last names and change of addresses. When setting the parameters for the kind of typographical errors, known frequencies from studies in spelling correction algorithms were used. See K. Kukich, "Techniques for automatically correcting words in text", *ACM Computing Surveys*, 24(4):377–439 (1992). For this study, the generator selected from 10% to 50% of the generated records for duplication with noise.

PRE-PROCESSING THE GENERATED DATABASE

Pre-processing the records in the database prior to the merge/purge operation might increase the chance of finding two duplicate records. For example, names like Joseph and Giuseppe match in only three characters, but are the same name in two different languages, English and Italian. A nicknames database or name equivalence database could be used to assign a common name to records containing identified nicknames.

Since misspellings are introduced by the database generator, the results can probably be improved by running a spelling correction program over some fields before submitting the database to the sorting neighborhood method. Spelling correction algorithms have received a large amount of attention for decades. See Kukich, Supra. Most of the spelling correction algorithms considered use a corpus of correctly spelled words from which the correct spelling is selected. A corpus for the names of the cities in the U.S.A. (18670 different names) is available and can be used to attempt correcting the spelling of the city field. The algorithm described by Bickel in M. A. Bickel. "Automatic correction to misspelled names: a fourth-generation language approach", *Communications of the ACM*, 30(3):224–228 (1987) was selected for its simplicity and speed. The use of spell corrector over the city field improved the percent of correctly found duplicated records by 1.5%–2.0%. A greater proportion of the effort in matching resides in the equational theory rule base. RUNNING THE SORTED NEIGHBORHOOD METHOD The purpose of this first experiment was to see how many duplicate records the sorted neighborhood method could find. Three independent runs of the sorted neighborhood method were run over each database, and a different key was used during the sorting phase of each independent run. On the first run the last name was the principal field of the key (i.e., the last name was the first attribute in the key). On the second run, the first name was the principal field of the key. Finally, in the last run, the street address was the principal field of the key. The selection of the keys was purely arbitrary, and could have used the social-security number instead of, say, the street address. The data generator is assumed to be controlled, such that all fields are noisy and therefore it should not matter which fields are selected.

Figure 1B:
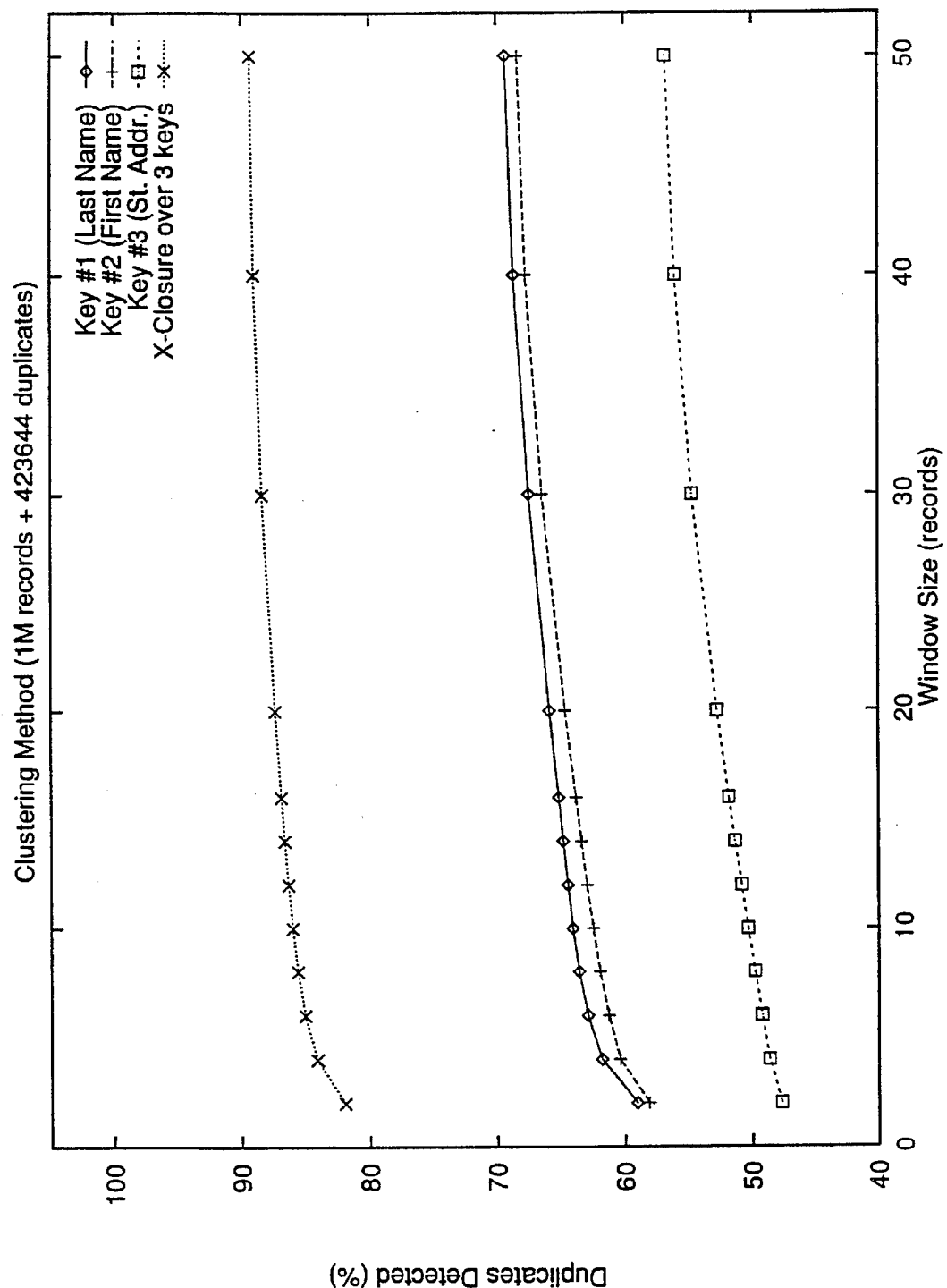

FIG. 1 shows the effect of varying the window size from 2 to 50 records in a database with 1,000,000 records and with an additional 1423644 duplicate records with varying noise. A record may be duplicated more than once. Each independent run found between 50 and 70% of the duplicated pairs. Increasing the window size does not help much and taking in consideration that the time complexity of the procedure goes up as the window size increases, it is obviously fruitless to use a large window size.

The line marked as X-closure over 3 keys in FIG. 1 graph shows the results when the program computes the transitive closure over the pairs found by the four independent runs. The percent of duplicates found goes up to almost 90%. A manual inspection of those records not found as equivalent revealed that most of them are pairs that would be hard for even a human to identify without further information (e.g., both records do not have a social security number, the names are the same or very close, the street addresses are the same but in different states).

Figure 2:
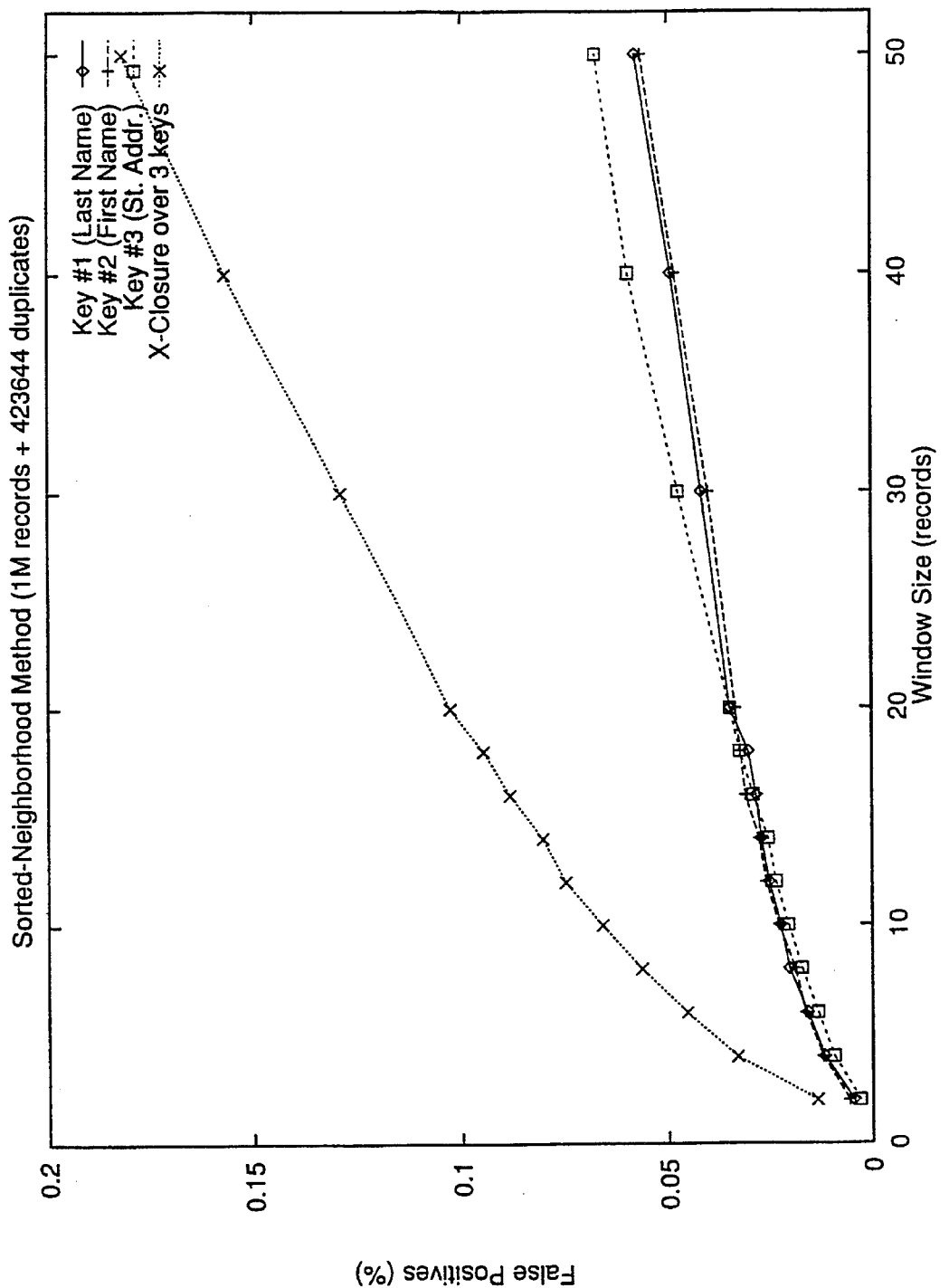
FIG. 2 is a graph of the percent incorrectly detected duplicated pairs for a 1,000,000 records database.

However, the equational theory is not completely accurate. It can mark two records as similar when they are not the same real-world entity (false-positives). FIG. 2 shows the percent of those records incorrectly marked as duplicates as a function of the window size. The percent of false positives is almost insignificant for each independent run and grows slowly as the window size increases. The percent of false positives after the transitive closure is used is also very small, but grows faster than each individual run alone. This suggests that the transitive-closure may not be effective if the window size is very large.

The number of independent runs needed to obtain good results with the computation of the transitive closure depends on how corrupt the data is and the keys selected. The more corrupted the data, more runs might be needed to capture the matching records. Although not shown in FIG. 1, the sorted-neighborhood method, conducted with only two independent runs and computing the transitive closure over the results of those two runs, produced a percentage of detected duplicate records of between 70% to 80%. The transitive closure, however, is executed on pairs of record id's, each at most 30 bits in the present example, and in general log N bits, and fast solutions to compute transitive closure exist. See R. Agarawal and H. V. Jagadish, "Multiprocessor transitive closure algorithms", *Proc. Int'l Symp. on Databases in Parallel and Distributed Systems*, pp 56–66 (December 1988). From observing real world scenarios, the size of the data set over which the closure is computed is at least one order of magnitude smaller than the matching database of records, and thus does not contribute a large cost. But note there is a heavy price due to the number of sorts of the original large data set.

ANALYSIS

The approach of using multiple sorts followed by the transitive closure is referred to as the multi-pass approach. The natural question posed is when is the multi-pass approach superior to the single sorted neighborhood case?. The answer to this question lies in the complexity of the two approaches for a fixed accuracy rate. The accuracy rate, as defined herein is the total percentage of "mergeable" records found.

The complexity of the multi-pass approach is given by the time to create keys, the time to sort r times, wherein the present example r=3 times, and window scanning r times (of window size w) plus the time to compute the transitive closure:

$$T(\text{multi-pass}) = c_1 rN + c_2 rN \log N + c_3 rwN + T(TC)$$

where r is the number of passes, and T(TC) is the time for the transitive closure. The constants depict the costs for comparison only and am related as $c_1 < c_2 \ll c_3 = \alpha c_2$, where $\alpha > 1$. From analyzing the experimental program, the window scanning phase contributes a constant, $c_3$, which is at least $\alpha = 3$ times as large as the comparisons performed in sorting, while the create keys constant, $c_1$, is roughly comparable to the comparisons used in sorting. Thus, for the purposes of the present analysis, it is assumed that $c_1 = c_2$, while $c_3 = c_2$. Hence, the constants are replaced in terms of the single constant c. The complexity of the closure is directly related to the accuracy rate of each pass and is certainly dependent upon the duplication in the database. However, it is assumed the time to compute the transitive closure on a database that is orders of magnitude smaller than the input database to be less than the time to scan the input database once (i.e. less than linear in N, and contributes a factor of $c_4 N < N$). Thus, $$T(\text{multi-pass}) = crN + crN \log N + \alpha crwN + c_4 N = (c + cr \log N + \alpha crw)N + c_4 N$$

for a window size of w. The complexity of the single pass sorted neighborhood approach is similarly given by:

$$T(\text{single-pass}) = cN + cN \log N + \alpha cWN = (c + c \log N + \alpha cW)N$$

for a window size of W.

For a fixed accuracy rate, the question is then for what value of W for the single pass sorted neighborhood method does the multi-pass approach perform better in time, i.e.

$$(c + c \log N + \alpha cW) > (cr + cr \log N + \alpha crw) + \frac{c_4 N}{N}$$

or $$W > \frac{r-1}{\alpha}(1 + \log N) + rw + \frac{c_4 N}{\alpha cN}$$

In the experiments performed and reported in the following sections, $N = 2^{20}$ records, $\alpha$ is approximately 3, c is approximately $8 \times 10^{-5}$, w=10, and $T(TC) = c_4 N \leq 180$ seconds. Thus, the multi-pass approach dominates the single sort approach when W>45.

Figure 3A:
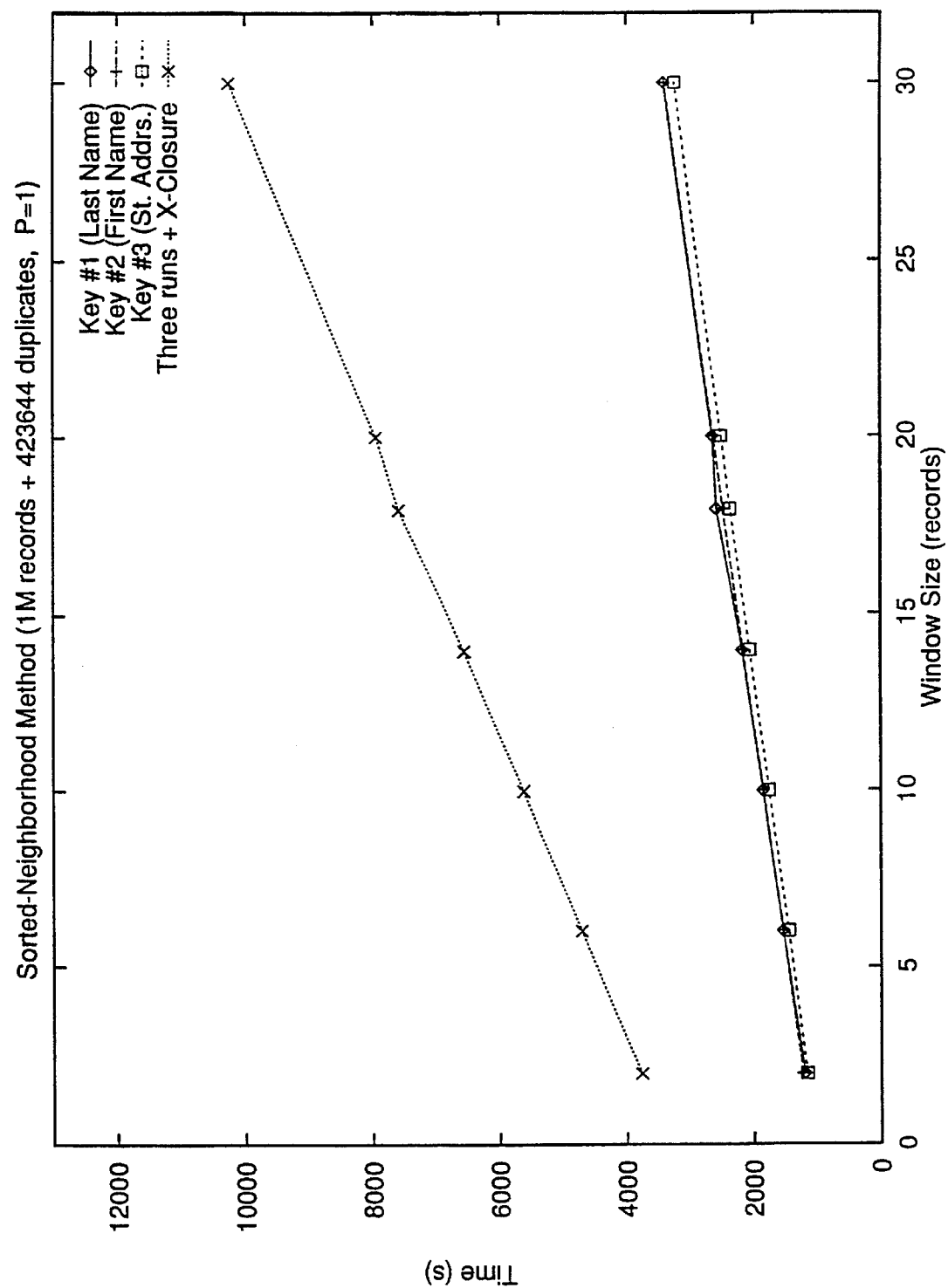
FIGS. 3A and 3B are two graphs of time results for the sorted-neighborhood and clustering methods on a single processor.
Figure 3B:
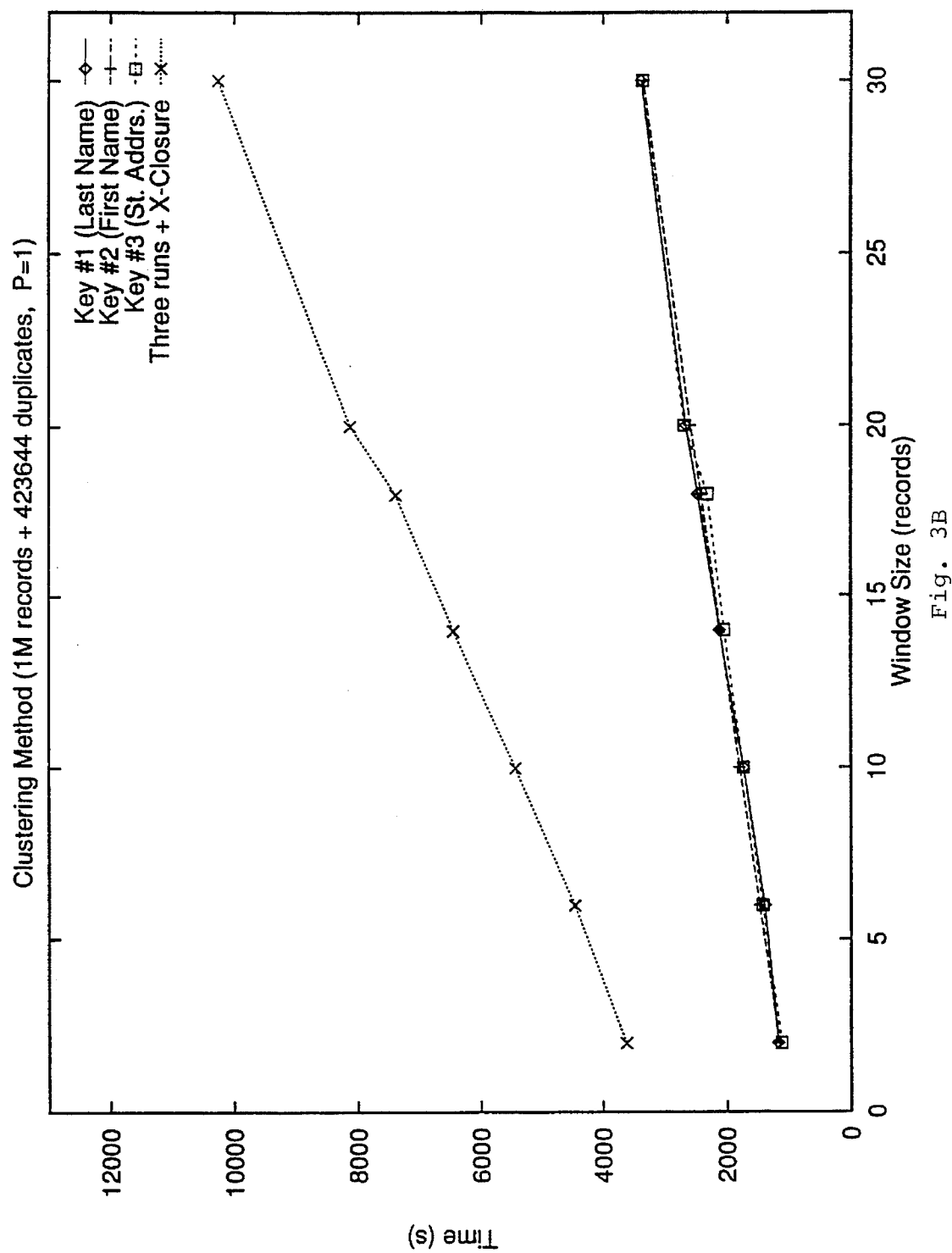
Figure 4:
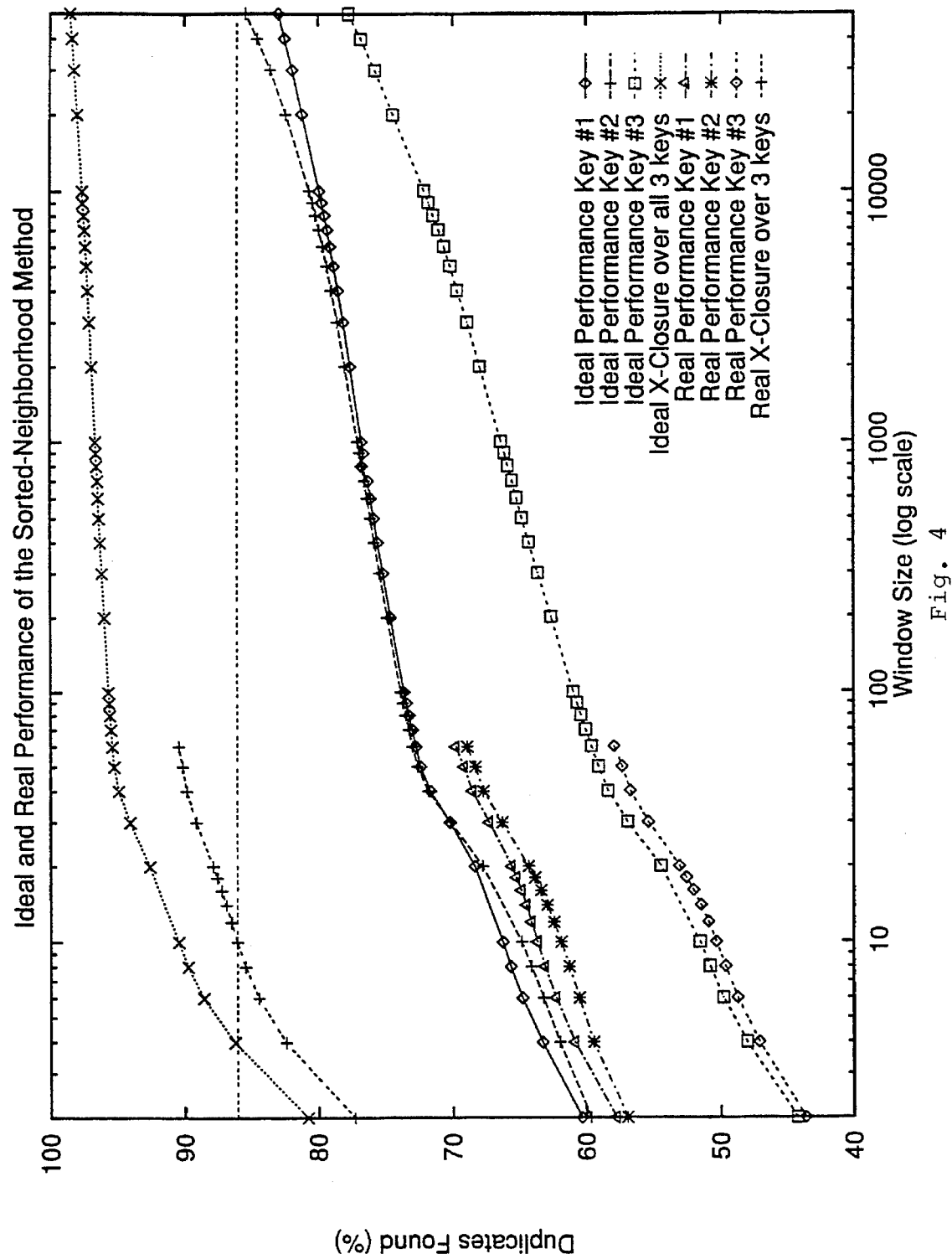
FIG. 4 is a graph of the ideal performance of the method according to the present invention.

FIG. 3 shows the time required to run each independent run of the sorted-neighborhood method on one processor, and the total time required for the multi-pass approach. As shown in FIG. 1, the multi-pass approach was found to produce an accuracy rate of 86.1% using a window size of 10. The time performance of the single pass run is similar to the time performance of the multi-pass approach with w=10 when W≈56, a little over what was estimated above. But, the performance ratios of all single-pass runs in FIG. 1, at W=50, are from 17% to 28%, well below the 86.1% performance of the multi-pass approach. To study how large the window size W must be for one of the single-pass runs to achieve the same level of performance as the multi-pass approach, the rule based equational theory was replaced with a stub that quickly tells us if two records within the window are actually equal (thus the "ideal" performance is studied). The results, depicted in FIG. 4, show that any single-pass run would need a window size larger than W=50,000 to achieve the same performance level as the multi-pass approach using w=10. The "real" performance lines in FIG. 4 are those of FIG. 1, which are included to provide a sense of how effective the present rule-based equational theory is when compared with the ideal case. Thus, the multi-pass approach achieves dramatic improvement in time and accuracy over a single-pass approach. Further, the multi-pass approach may also be parallelized, clearly making the multi-pass the dominate method.

EXAMPLE 2

THE CLUSTERING METHOD

The same experiment was repeated using the clustering method to first partition the data into clusters, using the same three keys used above for the sorted-neighborhood method and ran three independent runs, one for each key. Then the transitive closure over the results of all independent runs was computed. The results are depicted in FIG. 1. Comparing the performance results in FIG. 3, it is noted that the performance level is almost the same for both methods. The timing results for these experiments are shown in FIG. 3.

EXAMPLE 3

PARALLEL IMPLEMENTATION

With the use of a centralized parallel or distributed network computer, a linear speedup over a serial computer is sought to be achieved.

THE SORTED-NEIGHBORHOOD METHOD

The parallel implementation of the sorted-neighborhood method is as follows. Let N be the number of records in the database. The implementation is presumed to have P processors, each processor being able to store M+w records, where w is the size of the merge phase window, and M is a blocking factor. Furthermore, since very large databases are the subject of this example, it is assumed that P<<N and MP<N. First, the input database is sorted in parallel using the well known technique of parallel merge sorting. Then, the sorted database is divided into N/MP blocks. Each of the N/MP blocks is processed in turn as follows. Let $r_i$ represent record i in a block, $0 \leq i \leq MP-1$. Each processor p receives records $r_{(p-1)M}, \ldots, r_{pM-1}, \ldots, r_{pM+w-2}$, for $1 \leq p \leq P$, (i.e., each processor gets a partition of size M records plus the w−1 records of the next partition of the block). Then matching records can be searched independently at each processor using a window of size w. This process is then repeated with the next block of records. The time for the merge phase process under this scheme is, in theory, O(wN/P).

Each independent run of the sorted-neighborhood method is independent of other independent runs. Therefore, given n times more processors, independent runs may be executed concurrently and at the end compute the transitive closure over the results.

Figure 5A:
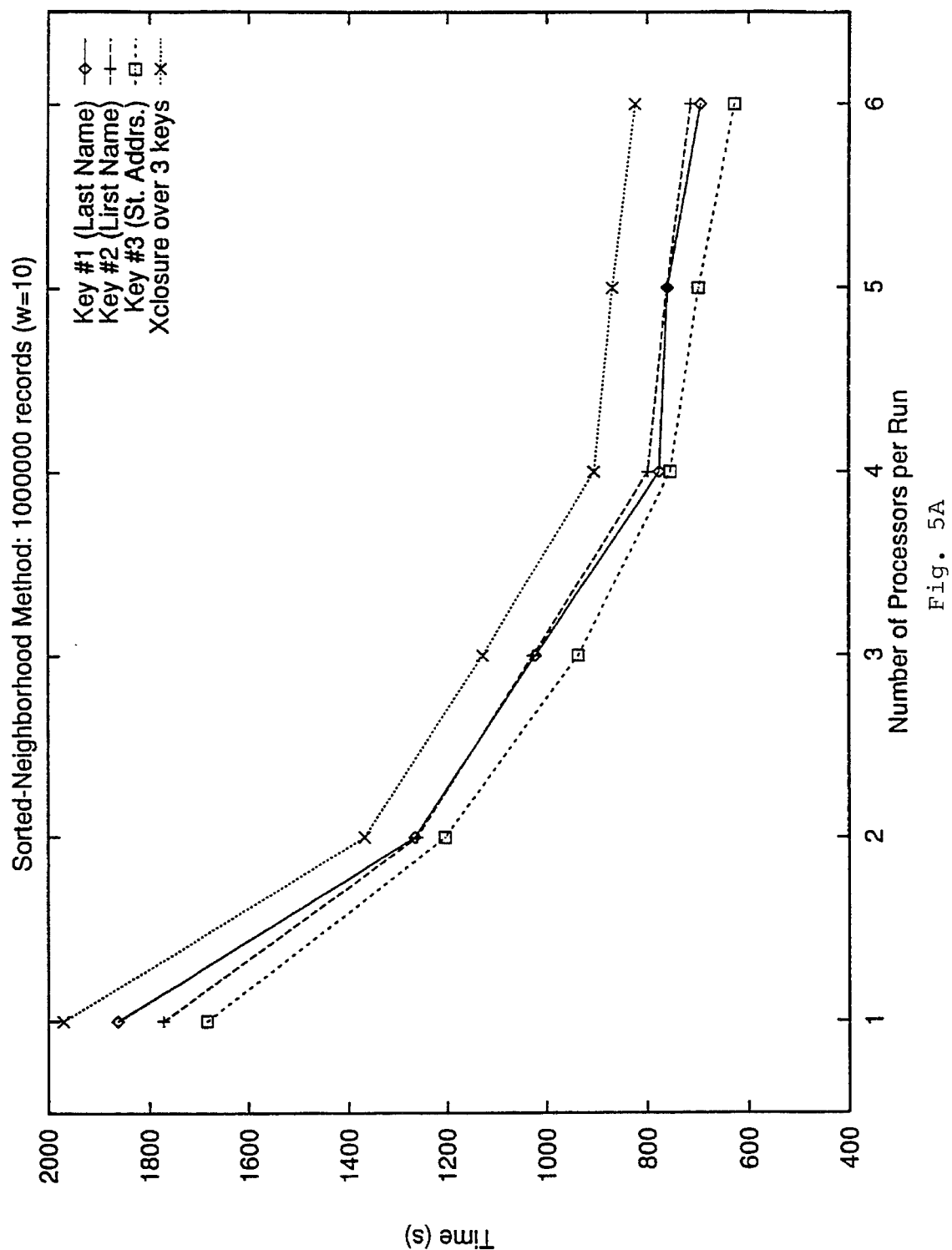
FIGS. 5A and 5B are two graphs of time results for the sorted-neighborhood and clustering methods on a multiprocessor system.
Figure 5B:
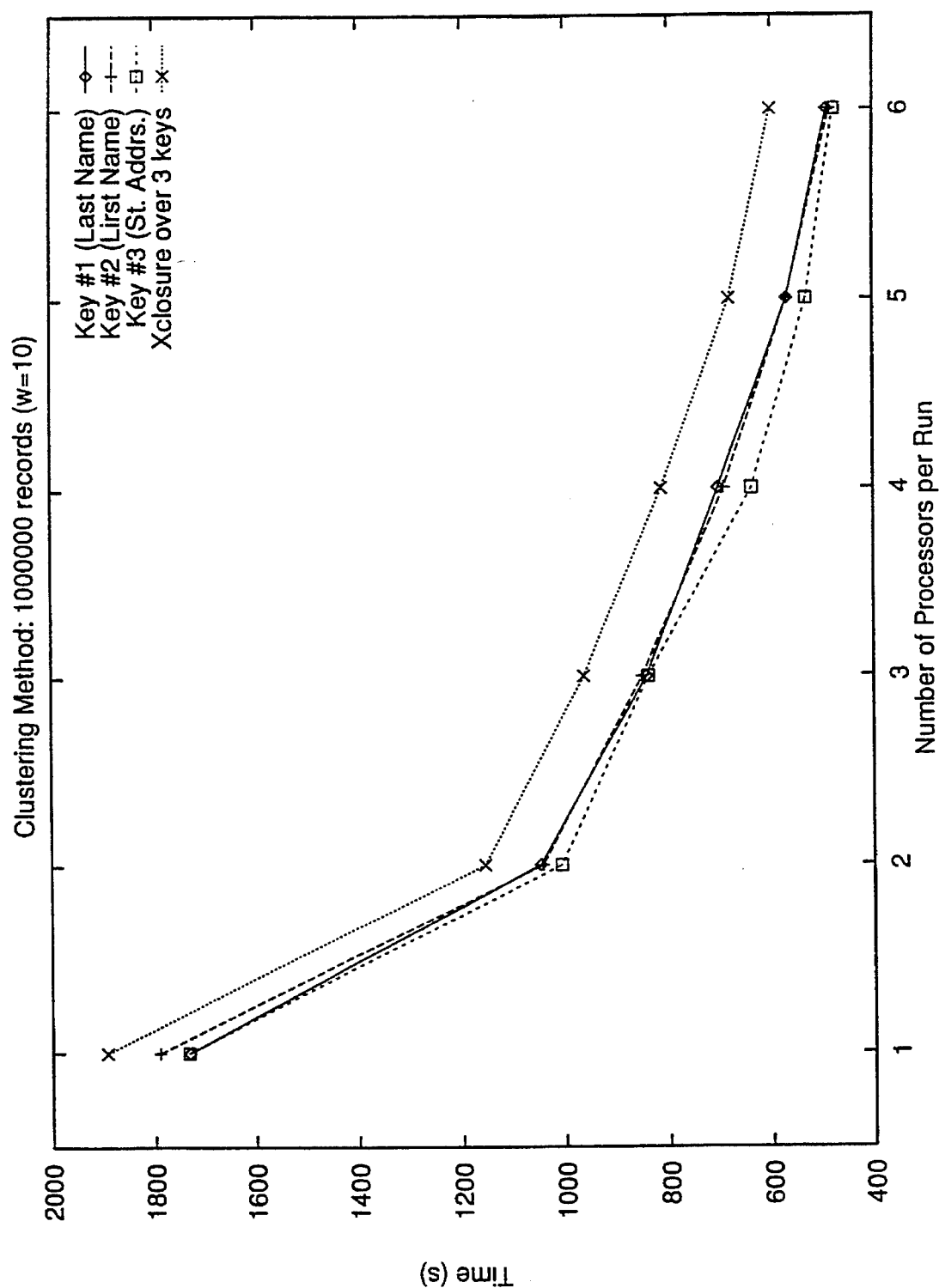

The sorted-neighborhood method was implemented on an HP cluster consisting of eight HP9000 processors interconnected by a FDDI network. FIG. 5 shows the total time taken for each of the three independent runs from FIG. 1 as the number of processors increases. The window size for all these runs was 10 records. FIG. 5 also includes the time it will take the sorted-neighborhood method to execute all three independent runs over three times the number of processor and then the computation of the transitive closure of the results. Using the system described above, enough processors to run all sorted-neighborhood runs concurrently were unavailable, so that the time taken for all of the runs must be estimated from results of each independent run. All independent runs were run serially and the results were stored on disk. The transitive closure was then computed over the results stored on disk and the time measured for this operation. The total time if all runs are executed concurrently is, approximately, the maximum time taken by any independent run plus the time to compute the closure. The speed-ups obtained as the number of processors grows are not exactly linear. The main reason for this is the inherent sequentialities in the process like reading and broadcasting the data to all processes.

EXAMPLE 4

THE CLUSTERING METHOD

The parallel implementation of the clustering method works as follows. Let N be the number of records in the database, P the number of processors and C the number of clusters to be formed per processor. Given a frequency distribution histogram, its range is divided into CP subranges as described above. Each processor is assigned C of those subranges. To cluster the data, a coordinator processor reads the database and sends each record to the appropriate processor. Each processor saves the received records in the proper local cluster. Once the coordinator finishes reading and clustering the data among the processors, all processors sort and apply the window scanning method to their local clusters.

Load balancing of the operation becomes an issue when more than one processor is used and the histogram method does a bad job of partitioning the data. The present system attempts to do an initial static load balancing. The coordinator processor keeps track of how many records it sent to each processor (and cluster) and therefore it knows, at the end of the clustering stage, how balanced the partition is. It then redistributes the clusters among processors using a simple longest processing time first (LPT) strategy. See R. Graham, "Bounds on multiprocessing timing anomalies", *SIAM Journal of Computing*, 17:416–429 (1969). That is, move the largest job in an overloaded processor to the most underloaded processor, and repeat until a "well "balanced load is obtained. Elements of this technique are known. See H. M. Dewan, M. A. Hernandez, J. Hwang, and S. Stolfo, "Predictive dynamic load balancing of parallel and distributed rule and query processing", *Proceedings of the* 1994 *ACM Sigmod Conference* (1994).

The time results for the clustering method are depicted in FIG. 5. These results are for the same database used to obtain the timing results for the sorted neighborhood method, a window size of 10 records, and 100 clusters per processor. Comparing the results in FIG. 5 it is noted that the clustering method is, as expected, faster than the sorted-neighborhood method.

EXAMPLE 5

SCALING UP

Figure 6A:
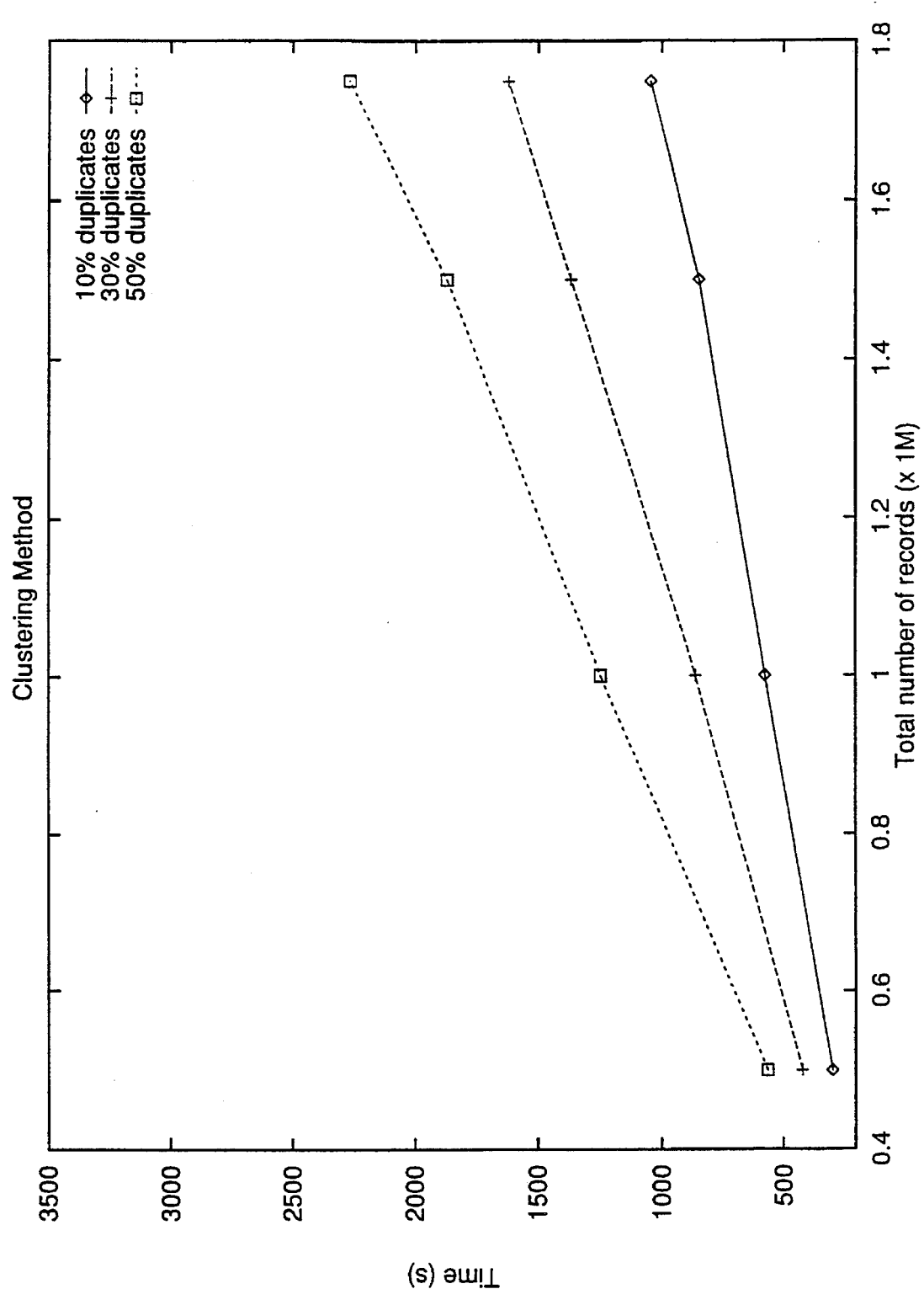
FIGS. 6A and 6B are two graphs of time results for the sorted-neighborhood and clustering methods for different size databases.
Figure 6B:
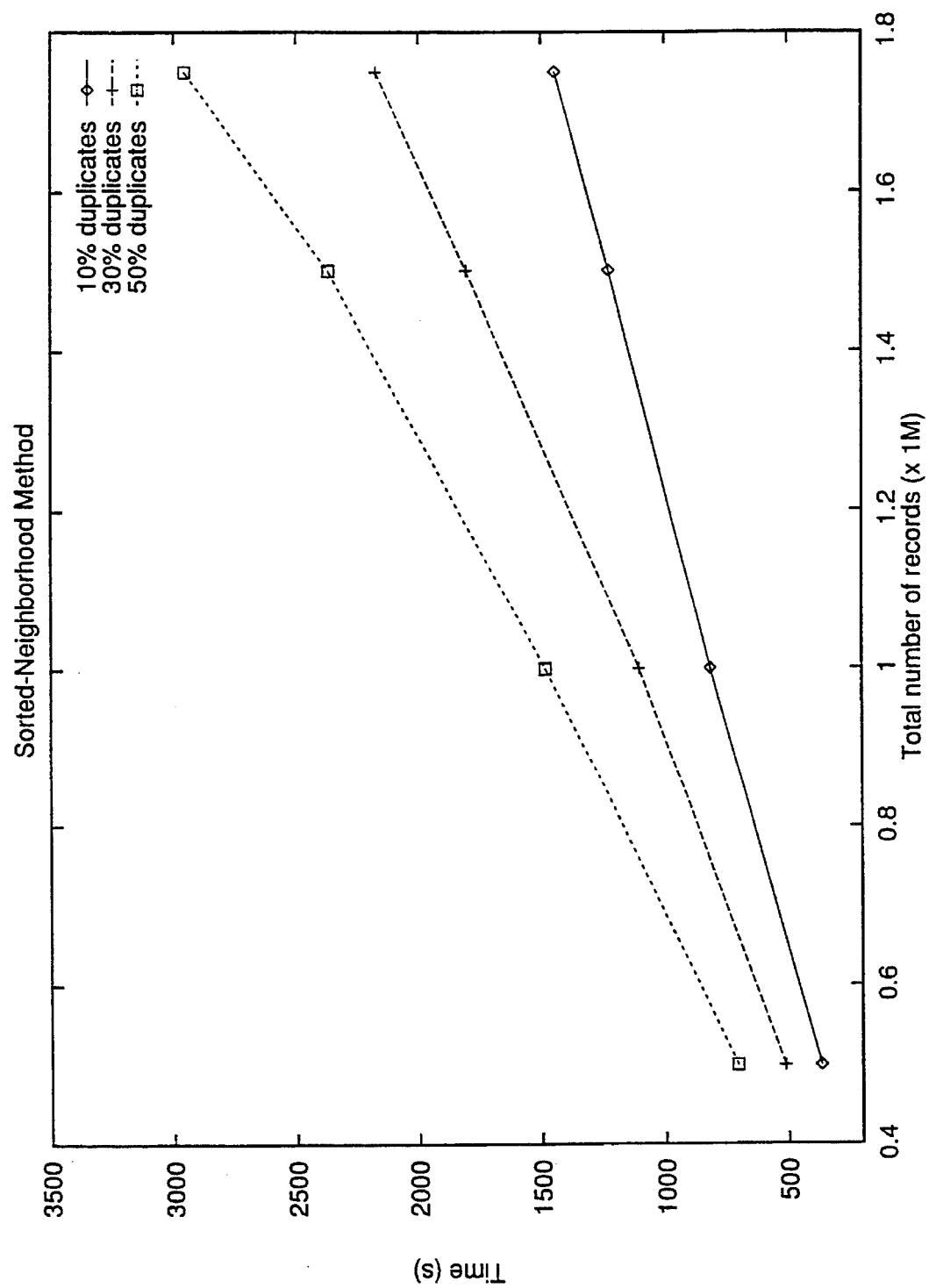

Finally, the sorted-neighborhood method and clustering method are demonstrated herein to scale well as the size of the database increases. The present example is limited, by virtue of limitations in disk space in the experimental system, to databases up to about 3,000,000 records. Of course, larger systems could be implemented without this limitation by providing more disk space. Again, three independent runs were run using the sorted-neighborhood method (and the clustering method), each with a different key, and then computed the transitive closure of the results. This was performed for the 12 databases as shown in Table 2 and ran all the experiments assigning 4 processors to each independent run. The results are shown in FIG. 6. As expected, the time increases linearly as the size of the databases increase.

TABLE 2

| Original number of records | Total records | | | Total size (Mbytes) | | |
|---|---|---|---|---|---|---|
| | 10 | 30 | 50 | 10 | 30 | 50 |
| 500000 | 584495 | 754354 | 924029 | 45.4 | 58.6 | 71.8 |
| 1000000 | 1169238 | 1508681 | 1847606 | 91.3 | 118.1 | 144.8 |

TABLE 2-continued

| Original number of records | Total records | | | Total size (Mbytes) | | |
|---|---|---|---|---|---|---|
| | 10 | 30 | 50 | 10 | 30 | 50 |
| 1500000 | 1753892 | 2262808 | 2770641 | 138.1 | 178.4 | 218.7 |
| 1750000 | 2046550 | 2639892 | 3232258 | 161.6 | 208.7 | 255.7 |

Using the graphs in FIG. 6, the time it will take to process 1 billion records using both methods may be estimated, assuming the time will keep growing linearly as the size of the database increases. For the sorted-neighborhood method, let us consider the last point of the "30" graph. Here, a database with 2,639,892 records was processed in 2172 seconds. Thus, given a database with 1,000,000,000 records, approximately $1 \times 10^9 \times (2172/263892)$ s= $8.2276 \times 10^5$ s $\simeq 10$ days will be needed. Doing the same analysis with the clustering method, a database of size 2,639,892 records was processed in 1621 seconds. Thus, given a database with 1,000,000,000 records, it is expected that approximately $1 \times 10^9 \times (1621/2639892)$ s=$6.1404 \times 10^5 \simeq 7$ days will be required. Of course, doubling the speed of the workstations and the channels used (which is possible today since the HP processors are slow compared to, for example, a DEC Alpha workstation, a RISC processor-based computer) would produce a total time that is at least half the estimated time.

The present system may preferably be applied to data relating to employee records, mailing lists, credit and credit cards, consumer preferences determined in retail environments or at the point of sale (POS). Data, such as point of sale data, is of particular value only when appropriate database records are merged, and the circumstances relating to the gathering of this type of data may also create a high likelihood of errors in the identifying information. Therefore, the present invention will improve the operation of systems processing various large databases including, e.g. consumer related data, due to its ability to efficiently process large numbers of database records and merge corresponding records in the database.

The above description, figures and preferred embodiments are provided not to limit the invention but to assist one skilled in the art in better understanding the invention contained herein. The inventor is not thereby limited to the preferred embodiments, but is only limited by the scope of the claims below. One of reasonable skill in the art can also practice the invention through other and equivalent methods, compositions and techniques which are, as well, included within the scope of the invention, to the extent set forth in the appended claims.

We claim:

1. A method of merging two databases of records, each record having a plurality of fields, comprising the steps of:

(a) computing a first key for each record in each database by extracting at least a portion of a first field:

(b) parallel merge sorting the records in each database using the first key;

(c) comparing to each other, on a first group of at least one processor, a predetermined number of sequential records sorted according to the first key to determine if one or more of the records match;

(d) storing identifiers for any matching records;

(e) computing a second key for each record in each database by extracting at least a portion of a second field;

(f) parallel merge sorting the records in each database using the second key;

(g) comparing to each other, on a second group of at least one processor, a predetermined number of sequential records sorted according to the second key to determine if one or more of the records match;

(h) storing identifiers for any matching records;

(i) creating a union of said stored identifiers;

(j) subjecting said union to transitive closure;

(k) wherein, in each group of processors for each database:
  (i) N is a number of records;
  (ii) P is a number of processors, each processor p, $1 \leq p \leq P$, being able to store M+w records;
    (a) w is a size of a merge phase window; and
    (b) M is a blocking factor;
  (ii) P is less than N;
  (iii) MP is less than N; and
  (iv) $r_i$ represents record i in a cluster. $0 \leq i \leq MP-1$; and (1) each said comparing step comprises the steps of:
  (i) dividing the sorted database into N/MP clusters;
  (ii) processing each of the N/MP clusters in turn by providing each processor p with records $r_{(p-1)M}, \ldots, r_{pM-1}, \ldots, r_{pM+w-2}$, for $1 \leq p \leq P$;
  (iii) searching matching records independently at each processor using a window of the size w; and
  (iv) repeating the processing step for a next cluster of records.

2. The method according to claim 1, wherein:

(a) in each group of processors for each database:
  (i) N is a number of records in the database;
  (ii) P is a number of processors p; and
  (iii) C is a number of clusters to be formed per processor p; and (b) each said comparing step comprises the steps of:
  (i) dividing the N records into CP subranges;
  (ii) assigning to each processor C clusters of the subranges;
  (iii) providing a coordinator processor which reads the database and sends each record to an appropriate processor where each record is received;
  (iv) saving each received record at each processor where it is received in a proper local cluster;
  (v) after the coordinator finishes reading and clustering the data among the processors, sorting and applying a window scanning method to the local clusters of each processor.

3. The method according to claim 2, wherein the coordinator processor load balances the various processors using a simple longest processing time first strategy.

* * * * *